Jan. 13, 1942.                C. J. HENSCHEL                2,269,874
                               HEATING DEVICE
                            Filed Sept. 5, 1940
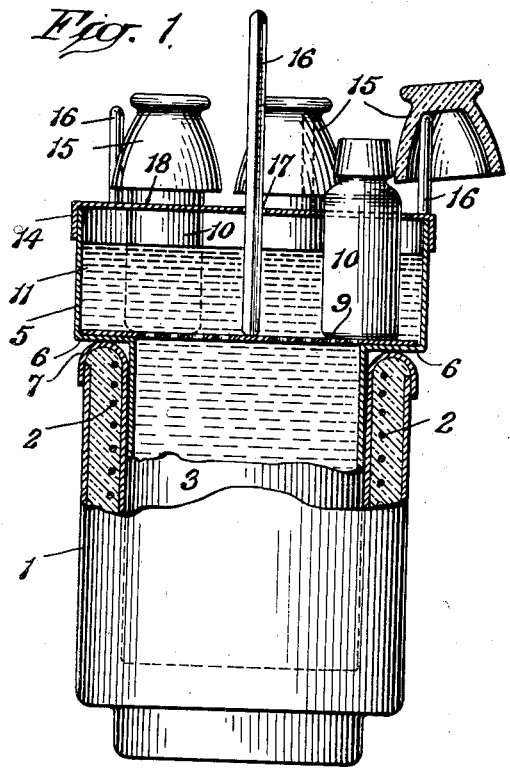
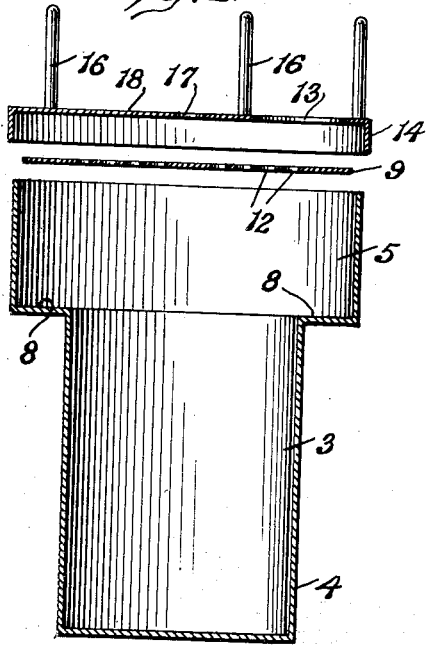
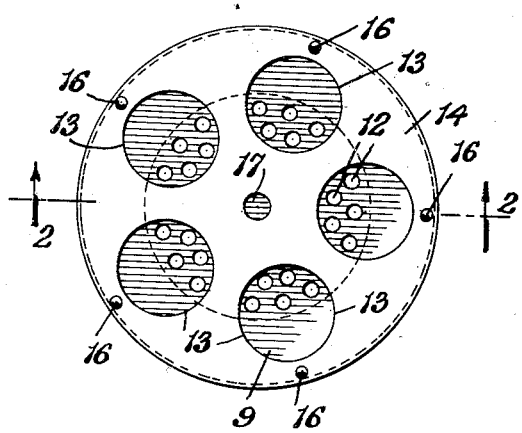
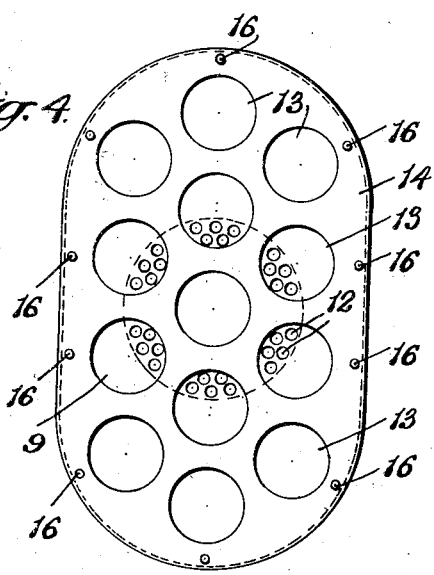
INVENTOR
Chester J. Henschel
BY
Harry Rudzinsky
ATTORNEY Patented Jan. 13, 1942

2,269,874

UNITED STATES PATENT OFFICE 2,269,874

HEATING DEVICE

Chester J. Henschel, New York, N. Y.

Application September 5, 1940, Serial No. 355,429

2 Claims. (Cl. 126—261)

This invention relates to a device adapted for use by dentists, physicians, laboratory technicians and others for heating drugs or other materials and for maintaining the same at a constantly uniform temperature. It has been ascertained, particularly in the dental industry, that it is highly desirable to maintain drugs and other materials employed on patients, at a constant uniform temperature and particularly at normal body temperature. The present invention therefore contemplates the provision of a relatively simple and inexpensive device for holding a number of bottles or other receptacles in which the drugs are contained, in such a manner as to subject the receptacles to the action of heated water which is maintained as at uniform temperature and will accordingly heat the contents of the bottles and maintain the contents at the required temperature.

More particularly, the invention contemplates the provision of a water-holding receptacle adapted for removable fitment within a heating cup, which may be the conventional spray-bottle heater employed by dentists, and which will heat the liquid contents of the receptacle, such liquid contents at least partly surrounding the bottles supported in the receptacle and having their tops exposed above the same and conveniently accessible to the dentist or physician.

In the accompanying drawing, wherein an embodiment of the invention is disclosed; Fig. 1 is a side elevation, with the upper portion in section, of a heating device constructed in accordance with the invention; Fig. 2 is a vertical sectional view of the water-holding receptacle, the bottle supporting shelf and the cover for the receptacle, the view being taken on the line 2—2 of Fig. 3, looking in the direction of the arrows; Fig. 3 is a plan view of the structure of Fig. 2 and Fig. 4 is a plan view of a modified structure.

With reference to the structure shown in Figs. 1 to 3 inclusive, 1 indicates the heater cup which may be of conventional form, and may preferably but not necessarily be the usual spray bottle heater employed by dentists. It includes the conventional heating coil 2 connected to a source of current and it can be maintained at a predetermined temperature by means of thermostatic control of known construction.

The water-holding receptacle shown at 3 is preferably made of metal or other heat-conducting material, and it has a lower, smaller-diameter cylindrical portion 4 which fits snugly within but readily removable from the heater cup 1. An enlarged upper portion 5 is formed on the receptacle, said enlarged portion forming the annular shoulder 6 which rests upon the top edge 7 of the heater cup and thereby supports the water-holding receptacle within the cup in the manner shown in Fig. 1. Provided within the receptacle 3, at the junction of the portions 4 and 5 is the internal annular seat 8 which serves as a support for a perforated shelf or grid 9 which forms a rest for the bottles 10 contained in the receptacle 3 and heated by the water 11 therein. The shelf 9 is perforated or apertured as indicated at 12, said apertures being located in the shelf in such locations or areas as may be found convenient or desirable. It is preferable that the shelf or grid 9 merely rest upon the seat 8 rather than be secured thereon so that it can thereby be readily removed when desired to permit cleansing of the interior of the water receptacle 3.

The bottles 10, containing the drugs or other materials to be heated, stand upon the shelf 9 and have their upper ends protruding through the openings 13 provided in the top plate 18 of the removable cover member 14 which fits snugly yet removably upon the top of the enlarged portion 5 of the water-holding receptacle and forms a closure therefor. The openings in the cover member are preferably in uniformly spaced relationship, as will be apparent from Fig. 3, and prevent the several bottles from being displaced or shifted, yet positions them so that they are easily accessible to the dentist or physician. As will be seen from Fig. 1, the tops of the bottles protrude out of and above the cover member 14 so that the caps 15 for the bottles can be quickly grasped and can be selectively removed to expose bottle contents whenever desired.

Situated adjacent to each of the openings 13 in the cover 14 in an upstanding peg 16 constituting a convenient support or rest for the top or closure 15 of the bottle located in the adjacent opening. This affords a convenient means by which the closure may be held in a sanitary manner adjacent to the bottle from which it is taken when the bottle is uncovered for access to its contents.

In the use of the device, the receptacle 3 is filled with water up to the level substantially indicated in Fig. 1 so that the water at least partially surrounds the lower parts of the bottles resting upon the shelf 9. Receptacle 3 is then placed within the heating cup and the water will be heated thereby to the required temperature. If desired means for checking on the water temperature may be provided, such means consisting, for example, of a thermometer 16 which can be inserted into the water 11 through the central hole 17 provided in the top plate of the cover member 14.

While I have described an illustrative embodiment of the invention, it will be obvious that the same may be altered in various ways to meet different requirements. For example while the structure of Figs. 1 to 3 inclusive shows the upper portion of the liquid-holding receptacle as being substantially cylindrical, it may be made in various other shapes, one example of which is disclosed in Fig. 4 wherein the upper or enlarged portion 5 of the liquid holding chamber is elongated or of oval conformation whereby a greater number of bottles may be accommodated. These and various other modifications may be made without departing from the spirit of the invention.

What I claim is:

1. A device of the character described comprising, a cylindrical heating cup, a cylindrical water-holding receptacle having a lower part of a diameter enabling it to fit within the heating cup and an upper cylindrical part of larger diameter than the cup, the junction of the lower and upper parts of the receptacle forming an annular shoulder resting upon the upper edge of the cup and supporting the receptacle with its lower part disposed within and surrounded by the cup, a removable apertured disk located in the upper part of the receptacle and supported upon the internal face of the annular shoulder and comprising an apertured floor therefor through which water may rise to reach the interior of the upper part of the receptacle, a plurality of bottles supported on said apertured disk, said bottles having their tops extending above the top of the receptacle, a cover member extending over the top of the receptacle, said cover member being provided with a plurality of spaced openings through which the tops of the bottles protrude, said openings holding the bottles in spaced relationship on the disk.

2. A device of the character described comprising, a liquid-holding receptacle having a lower part for reception by heating means, said receptacle having an upper part of larger diameter than the lower part, the junction of the lower and upper parts of the receptacle forming an annular shoulder, a removable apertured plate located in the upper part of the receptacle and supported upon the internal face of the annular shoulder and comprising an apertured floor therefor through which heated liquid may rise to reach the interior of the upper part of the receptacle, a plurality of bottles supported on said apertured plate, said bottles having their tops extending above the top of the receptacle, a cover member extending over the top of the receptacle, said cover member being provided with a plurality of spaced openings for holding the bottles in spaced relationship, the tops of the bottles protruding through said openings.

CHESTER J. HENSCHEL.